United States Patent [19]
Lai

[11] Patent Number: 5,479,501
[45] Date of Patent: Dec. 26, 1995

[54] FAR-END DISCONNECT DETECTOR FOR TELEPHONY SYSTEMS

[75] Inventor: Daniel T. Lai, Los Altos, Calif.

[73] Assignee: Rolm Systems, Santa Clara, Calif.

[21] Appl. No.: 134,497

[22] Filed: Oct. 8, 1993

Related U.S. Application Data

[63] Continuation of Ser. No. 710,417, Jun. 5, 1991, abandoned.

[51] Int. Cl.⁶ ..................................... H04M 1/00
[52] U.S. Cl. .......................... 379/377; 379/386; 379/387; 379/372
[58] Field of Search .................... 379/377, 381, 379/386, 387, 372

[56] References Cited

U.S. PATENT DOCUMENTS

| 4,064,488 | 12/1977 | Chapman | 379/386 X |
|---|---|---|---|
| 4,502,049 | 2/1985 | Atkinson | 379/386 X |
| 4,540,855 | 9/1985 | Szlam et al. | 379/386 X |
| 4,677,665 | 6/1987 | Walker | 379/386 |
| 4,747,131 | 5/1988 | Beirne | 379/372 |
| 4,922,528 | 5/1990 | Hubert et al. | 379/386 |
| 4,922,529 | 5/1990 | Kiel | 379/387 |
| 5,063,593 | 11/1991 | Kwon | 379/386 |
| 5,070,526 | 12/1991 | Richmond et al. | 379/372 |
| 5,109,409 | 4/1992 | Bangardner et al. | 379/386 X |

Primary Examiner—Jeffery A. Hofsass
Assistant Examiner—Magdy W. Shehata

[57] ABSTRACT

Method and apparatus for detecting a far-end disconnect signal for use by telephony applications such as voice messaging systems. In a preferred embodiment of the present invention, signal power of a telephone signal in particular frequency ranges is compared with the signal power in these frequency ranges for characteristic far-end disconnect signals used by telephone systems worldwide. Further, the cadence of the signal power of the telephone signal is examined to determine whether the cadence of the telephone signal is characteristic of far-end disconnect signals, including "busy signals" and "dial tones."

4 Claims, 3 Drawing Sheets

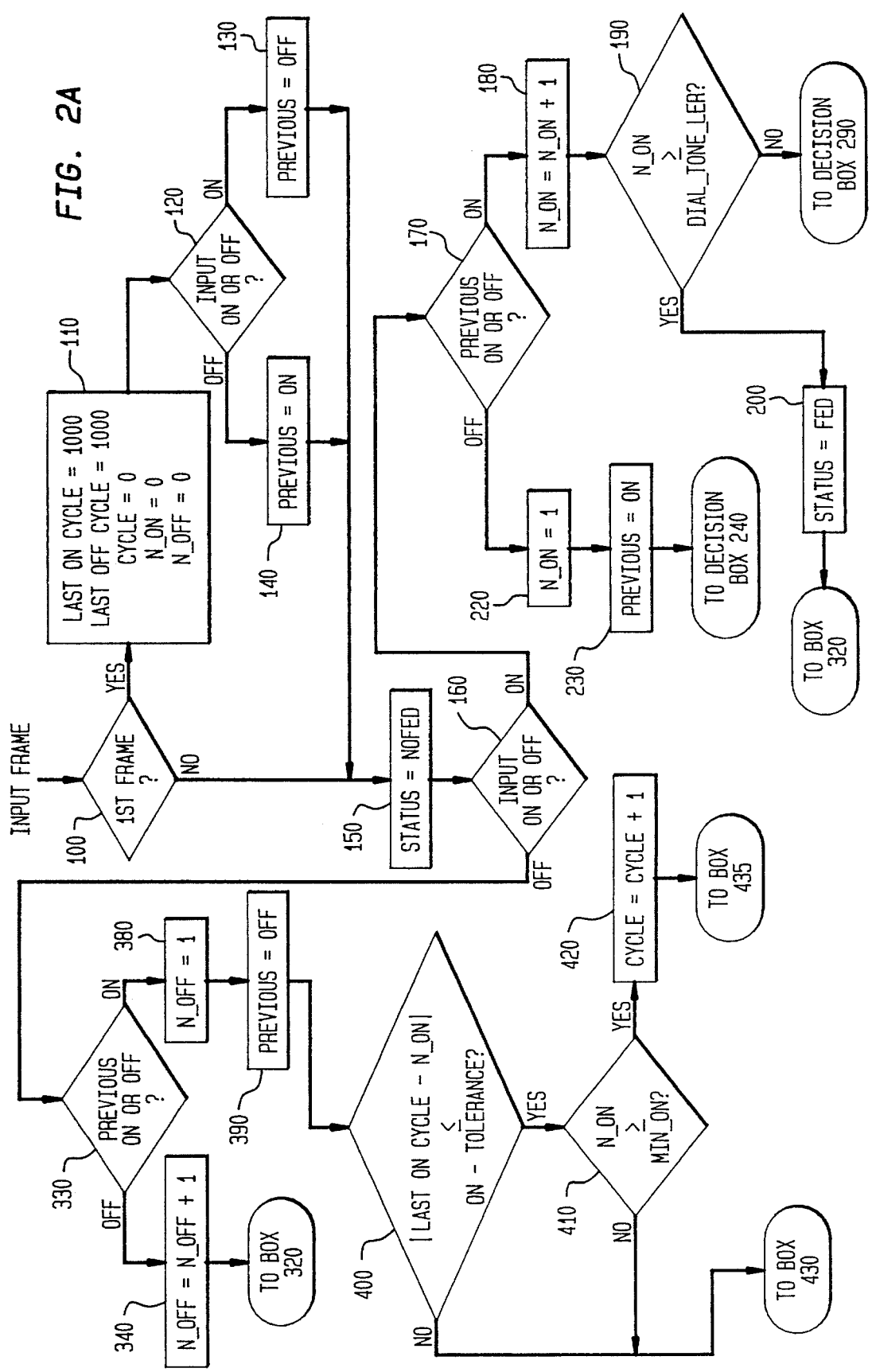

1

FAR-END DISCONNECT DETECTOR FOR TELEPHONY SYSTEMS

CROSS-REFERENCE TO RELATED APPLICATION

This is a continuation of Ser. No. 07/710,417 filed Jun. 5, 1991, now abandoned.

TECHNICAL FIELD OF THE INVENTION

The present invention relates to method and apparatus for detecting far-end disconnect of a telephone connection and, in particular, to method and apparatus for detecting tones and absences of tones on a telephone line and for determining whether they are representative of constant or cadenced signals which central office telephone systems worldwide use to indicate far-end disconnect.

BACKGROUND OF THE INVENTION

Telephone equipment and networks which are widely available in many countries around the world provide mechanisms to enable a telephone connected to a central office telephone system ("CO") to establish a telephone connection with a telephone or other device connected to a different CO, the telephone connection being for use in transmitting voice, data, facsimile or other messages. Whenever one of the telephones involved in a telephone conversation is disconnected from its CO, that CO sends a signal to the other telephone to indicate that far-end disconnect has occurred. That signal is referred to as a far-end disconnect signal.

Far-end disconnect signals vary from country to country and from central office telephone system manufacturer to manufacturer. Some examples of such far-end disconnect signals include "busy signals," "dial tones," "turkey tones," "silence," and so forth. These signals typically have relatively narrow frequency ranges and typically have constant or cadenced signal power. For example, a cadence which is typically used to provide a far-end disconnect signal is characterized by approximately matched on and off periods. Finally, whenever a near-end party hears a far-end disconnect signal, he or she will understand that the far-end party has disconnected and, as a result, the near-end party will hang up his or her telephone.

A problem arises when the near-end party is not a person who can recognize a far-end disconnect signal, but is a machine or a computer processor which is part of an automated telephony application system. An example of such an automated telephony application system is a voice store and forward messaging system which records incoming telephone messages for playback to a system user at a later time, such as a ROLM™ PhoneMail™ voice store and forward messaging system manufactured by ROLM Systems of Santa Clara, Calif. Whenever a far-end telephone disconnects from a connection with a voice store and forward messaging system, the voice store and forward messaging system will receive a far-end disconnect signal. As one can readily appreciate, the voice store and forward messaging system needs to detect the far-end disconnect signal to prevent the voice store and forward messaging system from storing the far-end disconnect signal as if it were a portion of an incoming voice message.

In order to detect far-end disconnect signals and to distinguish them from other signals, a far-end disconnect signal detector must distinguish the characteristics of far-end disconnect signals, such as their power and/or frequency spectrum, from those of other input signals. Presently available automated telephony application systems are deficient in the methods they utilize to distinguish far-end disconnect signals. In particular, one type of presently available automated telephony application system utilizes a far-end disconnect signal detector which comprises a country-specific or manufacturer-specific frequency detector and a country-specific cadence detector to detect and to identify the characteristics of far-end disconnect signals which differ from country to country and from central office telephone system manufacturer to manufacturer. For example, a typical such country-specific far-end disconnect signal detector in Japan will utilize a narrow band filter which is centered at approximately 400 Hz as a frequency detector, whereas a similar frequency detector in Hong Kong will utilize two narrow band filters which are centered at 480 Hz and 620 Hz, respectively. In addition, the output from such a country-specific filter is transmitted to a country-specific cadence detector to identify country-specific cadences which characterize the country-specific far-end disconnect signal. Such a diversity of far-end disconnect signal characteristics results in higher costs for development, manufacturing and support of automated telephony application systems which are intended to be marketed throughout the world.

Another type of presently available automated telephony application system utilizes a far-end disconnect signal detector which comprises an input signal power detector that identifies either constant input signal power or cadenced input signal power. Such a signal power detector is deficient in that it often fails to distinguish certain human voice patterns that may produce constant or cadenced power for a short period of time. For example, when a person says "ahh . . ." for a few seconds continuously, a constant or a cadenced input signal power detector will mistakenly identify the voice as a far-end disconnect signal. This results in the automated telephony application system's disconnecting the telephone call erroneously, a condition generally known as "talk-off."

As a result of the above-described problems concerning the identification of far-end disconnect signals by automated telephony application systems which are presently available in the prior art, there is a need for a method and apparatus for detecting and identifying far-end disconnect signals without requiring country-specific or manufacturer-specific frequency or cadence detectors.

SUMMARY OF THE INVENTION

Embodiments of the present invention advantageously satisfy the above-identified need in the art and provide a method and apparatus for use in conjunction with automated telephony application systems for detecting far-end disconnect signals.

In accordance with the present invention, a measure of the signal power of a telephone signal in a plurality of predetermined frequency bands is determined for each one of a predetermined number of consecutive periods of time, each of the periods of times being of predetermined length. During a given time period, a far-end disconnect signal is deemed to be present whenever: (a) the measure of the signal power output in specific ones of the frequency bands is greater than the measure of the signal power in other specific ones of the frequency bands and (b) the measure of the signal power in the specific ones of the frequency bands is greater than a predetermined value; otherwise a far-end disconnect signal is determined to be absent during the time period. If a far-end disconnect signal is deemed to be present during a time period, the status of that time period is set to ON and, conversely, if a far-end disconnect signal is deemed to be absent during the time period, the status of that time period is set to OFF.

Next, because telephone signals, including those containing far-end disconnect signals, are subject to noise, the ON or OFF status of each of the time periods is compared to the ON or OFF status of predetermined, preceding time periods in order to improve noise immunity of the far-end disconnect detector. If the status of a predetermined number of these predetermined, preceding time periods is ON, the status of the time period is determined to be ON; otherwise it is OFF.

After the ON or OFF status of each time period is determined in this manner, the ON or OFF status of the time period is applied as input to a cadence detector. The cadence detector signals the detection and identification of a far-end disconnect signal whenever the cadence detector determines that either of the following two situations exists: (a) a consecutive series, of at least a predetermined length, of periods of ON status has been input or (b) at least a predetermined number of alternating cycles of consecutive periods of ON status and consecutive periods of OFF status has been input, for which the lengths of the consecutive periods of ON status are approximately equal and the lengths of the consecutive periods of OFF status are approximately equal.

BRIEF DESCRIPTION OF THE DRAWING

A complete understanding of the present invention may be gained by considering the following detailed description in conjunction with the accompanying drawing, in which:

FIGS. 2A and 2B show a flow chart of a method which is used in fabricating a preferred embodiment of a cadence detector for use in the far-end disconnect detector shown in FIG. 1.

DETAILED DESCRIPTION

Figure 1:
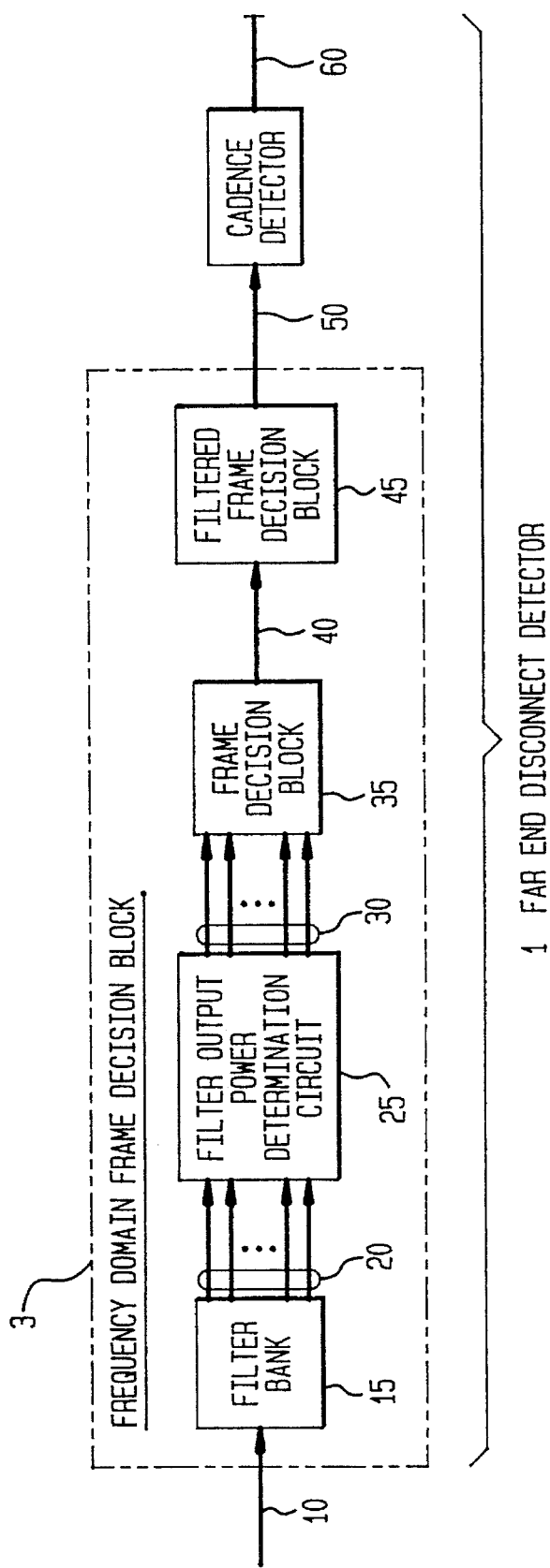
FIG. 1 shows a block diagram of a far-end disconnect detector which is fabricated in accordance with the present invention.

FIG. 1 is a block diagram of a preferred embodiment of far-end disconnect detector 1 which is used to detect a far-end disconnect signal. As shown in FIG. 1, telephone signal 10 is applied as input to Frequency Domain Frame Decision Block 3. Frequency Domain Frame Decision Block 3 is comprised of Filter Bank 15, Filter Output Power Determination Circuit 25, and Frame Decision Block 35.

As shown in FIG. 1, telephone signal 10 is applied as input to Filter Bank 15 which separates telephone signal 10 into several frequency ranges. In the preferred embodiment, Filter Bank 15 is comprised of 12 filters. The bandwidth of each of the 12 filters is approximately 250 Hz—specifically, filter 1 substantially covers a frequency range between 0 Hz and 250 Hz, filter 2 substantially covers a frequency range between 250 Hz and 500 Hz, . . . , and filter 12 substantially covers a frequency range between 2750 Hz and 3000 Hz. Those of ordinary skill in the art should understand that the present invention is not limited to the presently described embodiment of Filter Bank 15. For example, similar filters and filter banks having different bandwidths can be used as long as the bandwidths of the filters and filter banks span the frequency range of typical human speech signals and far-end disconnect signals.

Each filter in Filter Bank 15 outputs a signal and these outputs are shown collectively as filter output 20 in FIG. 1. Filter output 20 is applied as input to Filter Output Power Determination Circuit 25. In response to filter output 20, Filter Output Power Determination Circuit 25 provides a measure of the signal power of each one of the signals which comprise filter output 20 for predetermined periods of time. Filter Output Power Determination Circuit 25 outputs these measures of the signal power as individual signals which are shown collectively as signal power 30 in FIG. 1. In the preferred embodiment of the present invention, Filter Output Power Determination Circuit 25 comprises a multiplicity of circuits, each for use in determining the power of a signal output by a filter which comprises Filter Bank 15 as a measure of the power of that signal. Circuits for use in determining filter output power are well known to those of ordinary skill in the art. In a preferred embodiment of the present invention, the measure of the signal power of the individual signals which comprise filter output 20, i.e., the amplitude of signal power, are determined by Filter Output Power Determination Circuit 25 during 32 milliseconds periods referred to as frames. Those of ordinary skill in the art will understand that other frame lengths may be used to fabricate far-end disconnect detectors in accordance with the present invention as long as the frame length is shorter than a period of time which is characteristic of cadences of far-end disconnect signals used throughout the world.

For each frame, the measures of the signal power of the signals are output from Filter Output Power Determination Circuit 25 as signal power 30. Signal Power 30 is then applied as input to Frame Decision Block 35. Frame Decision Block 35 is apparatus which determines that a far-end disconnect signal is "present" during a frame whenever: (a) the sum of the signal power output by one or more predetermined filters which cover the frequency range of a far-end disconnect signal is greater than the sum of the signal power output by each of one or more predetermined filters which cover the frequency range of typical human speech which falls above and below the frequency range of a far-end disconnect signal and (b) the absolute value of the sum of the signal power output by one or more predetermined filters which cover the frequency range of a far-end disconnect signal is greater than a predetermined value. If both of the above conditions is satisfied, Frame Decision Block 35 determines that a far-end disconnect signal is "present" and Frame Decision Block 35 outputs signal 40 having a value which represents an ON condition. However, if any one of the above conditions is not satisfied, Frame Decision Block 35 determines that a far-end disconnect signal is "not present" and Frame Decision Block 35 outputs signal 40 having a value which represents an OFF condition.

In the preferred embodiment of this invention, Frame Decision Block 35 determines that a far-end disconnect signal is "present" during a frame whenever both of the following conditions are true: (a) the sum of the output power of filters 2 and 3, which filters substantially span the frequency range between 250 Hz and 750 Hz, is greater than the output power of certain of the other filters by more than a predetermined amount FEDSNR—in the preferred embodiment FEDSNR=24 dB— and (b) the sum of the output power of filters 2 and 3 is greater than a predetermined amount MIN_POWER—in the preferred embodiment MIN_POWER=−30 dBm. These conditions may be expressed as follows:

$$\{\text{power[band 2]} + \text{power[band 3]}\} - \text{power[band } j] \geq FEDSNR\text{(e.g., 24 dB) for } j=5\ldots12 \text{ and } \{\text{power[band 2]} + \text{power[band 3]}\} \geq \text{MIN\_POWER (e.g., } -30 \text{ dBm)} \quad \text{eqn. (1)}$$

Although the equations set forth above use frequency ranges 5 through 12, the present invention is not restricted to this choice of frequency ranges. Further, the present invention is not restricted to the use of the same parameter value for each frequency range. For example, one may utilize frequency range 4 with the same FEDSNR requirement for band 4 or with a reduced FEDSNR requirement for band 4. Further, one may skip some of the bands or add others.

In other cases, i.e., where eqn. (1) is not satisfied, Frame Decision Block 35 determines that a far-end disconnect signal is "not present" during that frame period. Advantageously, the frequency range covered by filters 2 and 3, i.e., approximately 250 Hz to 750 Hz, corresponds to a frequency range that covers dial tones, busy tones, most call progress tones, and far-end disconnect signals for most parts of the world. Threshold values of 24 dB and −30 dBm were chosen for FEDSNR and MIN_POWER, respectively, because it was determined, as a result of experimentation, that these values enable Frequency Domain Frame Decision Block 3 and the subsequent components of the preferred embodiment of Far-End Disconnect Detector 1 described herein to distinguish far-end disconnect signals throughout the world. In the preferred embodiment of the present invention, Frame Decision Block 35 may be fabricated, for example, using a processor such as a microprocessor or a digital signal processor (DSP).

Output signal 40 from Frequency Domain Frame Decision block 3 is then applied as input to Filtered Frame Decision Block 45. In the preferred embodiment of the present invention, Filtered Frame Decision Block 45 may be fabricated, for example, using a processor such as a microprocessor or a DSP. In order to improve noise immunity of Far-End Disconnect Detector 1, output signal 40 from Frequency Domain Frame Decision Block 3 for a current frame is compared with information which was received from Frequency Domain Frame Decision Block 3 as output signal 40 during a predetermined number of predetermined ones of preceding frames. In the preferred embodiment of this invention, Filtered Frame Decision Block 45 uses a voting scheme to improve the noise immunity of Far-End Disconnect Detector 1. This voting scheme compares the ON or OFF value which comprises output signal 40 for the current frame with the ON or OFF values of the two immediately preceding frames. The majority value of these frames becomes the value Filtered Frame Decision Block 45 outputs as signal 50. Those of ordinary skill in the art should understand that the present invention is not restricted to this scheme for improving noise immunity and that other methods of improving noise immunity could be used in other embodiments of the present invention. For example, the majority vote described above could also be based on value for the current frame and for the three immediately preceding frames. Some embodiments of the present invention may omit Filtered Frame Decision Block 45 and utilize a different set of parameters for Cadence Detector 55, as will be described below, to provide tolerance for a noisy signal.

Signal 50 which is output from Filtered Frame Decision Block 45 is then applied as input to Cadence Detector 55. Cadence Detector 55 determines whether a far-end disconnect signal has been received by first measuring the lengths of consecutive cycles of frames having ON values and OFF values which are received as signal 50 from Filtered Frame Decision Block 45. The ON frames represent periods during which the power and frequency characteristics of the telephone signal are characteristic of far-end disconnect signals, whereas, the OFF frames represent periods during which the power and frequency characteristics of the telephone signal are not characteristic of far-end disconnect signals. Further, consecutive cycles of ON and OFF frames of approximately equal durations provide a cadence which is representative of a typical far-end disconnect signal.

In particular, Cadence Detector 55 compares the number of ON frames in the most recent two cycles of ON frames and compares the number of OFF frames in the most recent two cycles of OFF frames. Then, approximately matched cycles of ON frames and approximately matched cycles of OFF frames are counted. If a predetermined number of approximately matched cycles are detected, Cadence Detector 55 generates signal 60 to indicate that a far-end disconnect signal has been detected and identified. If the two most recent ON cycles do not approximately match each other or the two most recent OFF cycles do not approximately match each other, Cadence Detector 55 resets its cycle count to 0.

In addition to the above, Cadence Detector 55 will also generate signal 60 to indicate that a far-end disconnect signal has been detected and identified whenever a tone is detected which has a number of consecutive ON frames which is larger than a predetermined value DIAL_TONE_LEN—in the preferred embodiment DIAL_TONE_LEN=125 frame=4 seconds. Such a tone is referred to as a steady tone and is typical of "dial tone."

Figure 2B:
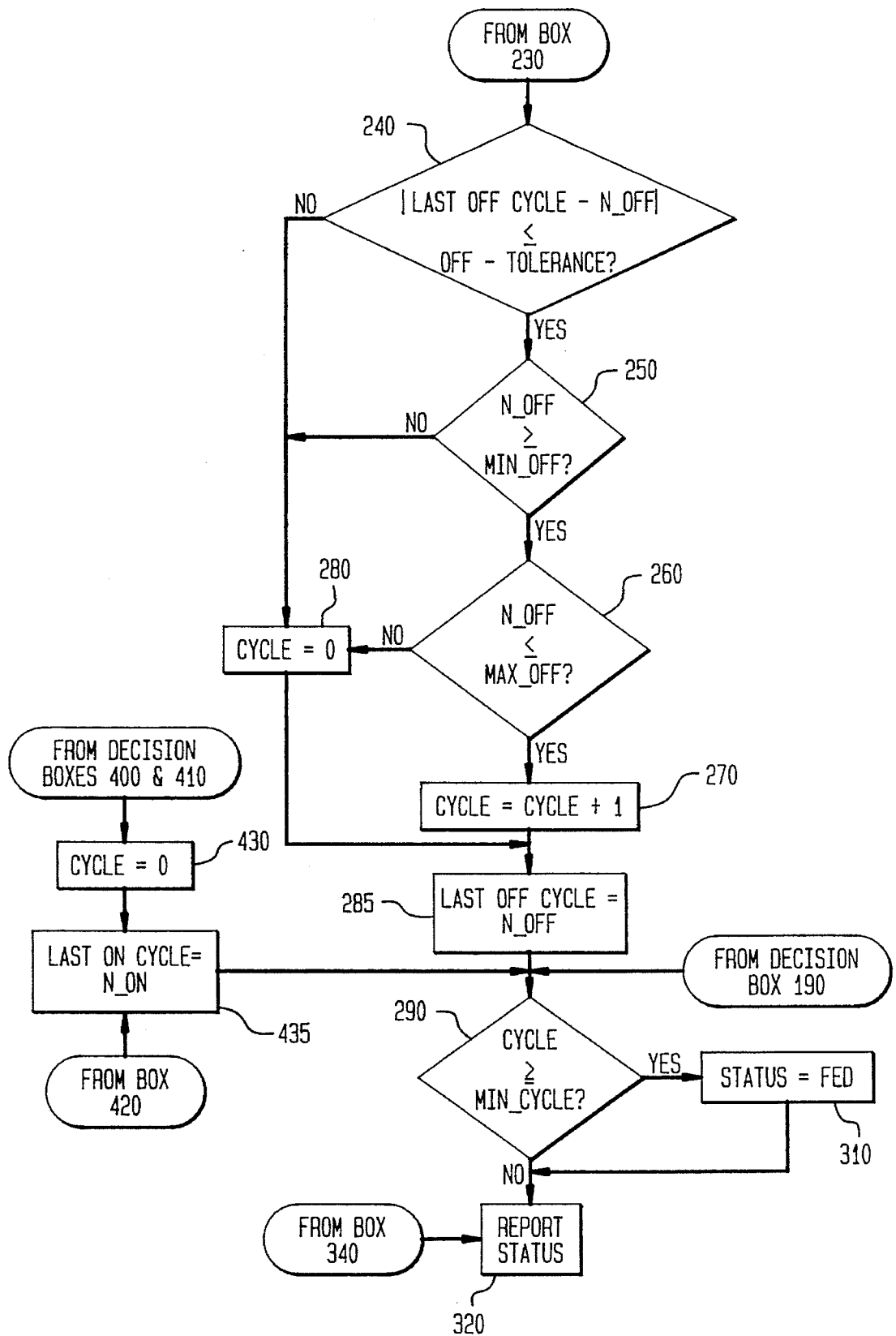

FIGS. 2A and 2B are a flow chart of a program which was implemented on a microprocessor to fabricate Cadence Detector 55 for use in the preferred embodiment of the present invention. The following provides an overview of the program and it will be followed by a detailed description of the program in connection with the flow chart shown in FIGS. 2A and 2B.

The program initializes certain variables if it determines that the input frame is the first frame of a telephone connection. These initialized values prevent the program from erroneously treating the first frame of a telephone connection as the continuation of a prior detection period of time and these initialized values prepare Cadence Detector 55 for counting the number of cycles of ON and OFF frames. The variable Status which indicates whether or not a far-end disconnect signal has been detected is also initialized. The remainder of the program determines whether the value of the variable Status should be changed to indicate that a far-end disconnect signal has been detected.

The program takes one of two paths depending on whether the input frame is ON Or OFF. If the input frame is ON, the program determines whether this is a continuation of a sequence of ON frames or the start of a new period of ON frames. If the input frame is OFF, the program determines whether this is a continuation of a sequence of OFF frames or the start of a new period of OFF frames.

If the input frame is part of a sequence of ON frames, the program increments;its count of ON frames. The program determines whether the period of ON frames is sufficiently long to indicate a "dial tone," a special kind of far-end disconnect signal characterized by a continuous tone. If such a signal is detected, the program sets the variable Status to indicate that a far-end disconnect signal has been detected.

If the input frame is the start of a new sequence of ON frames, the program initializes the count of consecutive ON frames to 1. The program next determines whether the just-ended OFF period was approximately equal in duration to the previous OFF period and whether the OFF period was neither too long nor too short to be characteristic of a far-end disconnect signal. If all of these conditions are true, the program adds one to the cycle count; otherwise, the cycle count is reset to zero.

If the input frame is part of a sequence of OFF frames, the program increments its count of OFF frames.

If the input frame is the start of a new sequence of OFF frames, the program initializes the count of consecutive OFF frames to 1. The program next determines whether the just-ended ON period was approximately equal in duration to the previous ON period and whether the ON period was not too short to be characteristic of a far-end disconnect signal. If both of these conditions are true, the program adds one to the cycle count; otherwise, the cycle count is reset to zero.

Finally, the program determines whether the cycle count is sufficiently high to be characteristic of a cadenced far-end disconnect signal. If so, the variable Status is set to indicate that a far-end disconnect signal has been detected.

FIGS. 2A and 2B are a flow chart for use in fabricating the preferred embodiment of the program. As shown in FIG. 2A, at decision block 100, the program determines whether the input frame is the first frame of a telephone connection. If so, control is transferred to action block 110, otherwise, control is transferred to action block 150.

At action block 110, several variables used in the remainder of the program are initialized to predetermined values. The count of the number of successive ON frames, N_ON, and the count of the number of successive OFF frames, N_OFF, are initialized to 0. These initial values are used because the actual cycles of ON and OFF frames will necessarily be longer than 0 and, as will be clear below, the program will therefore not falsely match the first cycle with a non-existent previous cycle. The variables LastOnCycle and LastOffCycle are initialized to 1000. As will be clear from the description of the remainder of the program below, the initial value of LastOnCycle needs to be greater than predetermined amount DIAL_TONE_LEN and the initial value of LastOffCycle needs to be greater than predetermined amount MAX_OFF. Further, the count of consecutive matching cycles, Cycle, is also initialized to 0 to indicate that no previous matches of consecutive ON times or consecutive OFF times have yet been found in this telephone signal. Control is then transferred to decision block 120.

At decision block 120, the program determines whether the input to Cadence Detector 55 is ON. If so, control is transferred to action block 130, otherwise, control is transferred to action block 140.

At action block 130, the program initializes the value of variable Previous to OFF. This value is used to indicate that the input, having been determined at decision block 120 to be ON, is the first value in a new cycle. Control is then transferred to action block 150.

At action block 140, the program initializes the value of variable Previous to ON. This value is used to indicate that the input, having been determined at decision block 120 to be OFF, is the first value in a new cycle. Control is then transferred to action block 150.

At action block 150, the program initializes the value of variable Status to NOFED. This value is used to indicate that the program has not identified a far-end disconnect signal. Control is then transferred to the decision block 160.

As will be seen, the remainder of the program determines whether the value of Status should be changed to FED to indicate that the program has identified a far-end disconnect signal.

At decision block 160, the program determines whether signal 50 which is input to Cadence Detector 55 is ON. If so, control is transferred to decision block 170, otherwise, control is transferred to action block 330.

The description of the program that follows is based on the assumption that signal 50 which is input to Cadence Detector 55 is ON. After the flow through the program is described for that alternative, the opposite alternative, where signal 50 which is input is OFF, will be described.

At decision block 170, the program determines whether the value of Previous, representing the input to Cadence Detector 55 for the immediately preceding frame of the telephone signal, is ON. If so, this indicates that two or more successive frames have been ON and control is transferred to action block 180, otherwise this indicates that this is the first ON frame of the cycle and control is transferred to action block 220. Note should be taken of the following. As was discussed earlier, if the first frame of a telephone signal is ON, Previous would have been initialized to OFF to prevent the first ON frame of a message from being treated as a continuation of a series of previous ON frames. Therefore, if the first frame of a telephone signal is ON, control will be transferred to action block 220 rather than action block 180.

At action block 180, the program increments the count of the number of successive ON frames, N_ON, by 1. Control is then transferred to decision block 190.

At decision block 190, the program compares the number of successive ON frames, N_ON, with a predetermined amount, DIAL_TONE_LEN. If N_ON is greater than or equal to DIAL_TONE_LEN, then the program has detected a dial tone signal, which is one type of far-end disconnect signal. If so, control is transferred to action block 200, otherwise, control is transferred to decision block 290.

At action block 200, the program sets the value of Status to FED to indicate that a far-end disconnect signal, in this case a dial tone, has been detected. Control is then transferred to action block 320.

The program reaches action block 220 after it determines (in decision block 170) that this is the first ON frame of the cycle. In action block 220, the program sets the value of N_ON to 1. This indicates that the input frame is the first ON frame of a new cycle and that the previous OFF period, if any, is ended. Control is then transferred to action block 230.

At action block 230, the program sets the value of Previous to ON. The effect of this will be that the next succeeding frame, if ON will be treated as a continuation of a sequence of ON frames, and if OFF, will be treated as the start of a new sequence of OFF frames. Control is then transferred to decision block 240.

At decision block 240, the program compares the duration of the last OFF period with the duration of the immediately preceding OFF period. In particular, the absolute value of the difference in duration between the two successive OFF periods is compared with a predetermined value, OFF_TOLERANCE. If the absolute value of the difference is greater than OFF_TOLERANCE, the program has determined that the two successive OFF periods are not approximately equal in length and that no far-end disconnect signal has been detected. In that event, control is transferred to action block 280, otherwise, control is transferred to decision block 250. The value of OFF_TOLERANCE is 2 in the preferred embodiment, indicating that the maximum difference in OFF time for two successive OFF periods is 2 frames (or 64 milliseconds) in order for the two periods to be considered sufficiently equal in length to constitute an additional repetition of a cycle. Either a wider or narrower tolerance could be used in other embodiments of the present invention.

At decision block 250, the program compares the length of the last OFF period with a predetermined minimum OFF period, MIN_OFF. If the length of the last OFF period is less than MIN_OFF, then the length of the OFF period is too short for the signal to be a far-end disconnect signal. In that event, control is transferred to action block 280, otherwise, control is transferred to decision block 260. The value of MIN_OFF is 6 in the preferred embodiment, indicating that the minimum length of an OFF period in a far-end disconnect signal is 6 frames (or 192 milliseconds) in order for the period to be recognized as a part of a far-end disconnect signal. Either a longer or a shorter minimum OFF period could be used in other embodiments of the present invention.

At decision block 260, the program compares the length of the last OFF period with a predetermined maximum OFF period duration, MAX_OFF. If the length of the last OFF period is greater than MAX_OFF, then the length of the OFF period is too long for the signal to be a far-end disconnect signal. In that event, control is transferred to action block 280, otherwise, control is transferred to action block 270. The value of MAX_OFF is 30 in the preferred embodiment, indicating that the maximum length of an OFF period in a far-end disconnect signal is 30 frames (or 960 milliseconds) in order for the period to be recognized as a part of a far-end disconnect signal. Either a longer or a shorter maximum OFF period could be used in other embodiments of the present invention.

At decision block 270, the program increments the count of the number of cycles detected, Cycle, by 1. Control is then transferred to action block 285.

The program reaches decision block 280 after it has determined that the last OFF period is either not the same as the previous OFF period or that it is too long or too short for the signal to be a far-end disconnect signal. At decision block 280, the program resets the count of the number of cycles detected, Cycle, to 0. Control is then transferred to action block 285.

At action block 285, the program sets LastOffCycle=N_OFF. Then, control is transferred to decision block 290.

At decision block 290, the program compares the count of the number of cycles detected thus far, Cycle, with a predetermined minimum number of cycles, $MIN_{13}$ CYCLE, necessary for the input signal to be a far-end disconnect signal. If Cycle is greater than or equal to MIN_CYCLE, control is transferred to action block 310, otherwise, control is transferred to action block 320. The value of MIN_CYCLE is 5 in the preferred embodiment, indicating that the minimum number of consecutive matching ON and OFF periods is 5 for a far-end disconnect signal. Either a smaller or a larger number of consecutive matching ON and OFF periods could be used in other embodiments of the present invention.

The program reaches action block 310 after detecting that there have been a sufficient number of consecutive matched ON and OFF periods to indicate the presence of a far-end disconnect signal. At action block 310, the program changes the value of Status to FED. Control is then transferred to action block 320.

At action block 320, the program reports the value of Status and the program has completed processing of the current input frame.

The description of the program thus far has been based on the assumption that the input frame is ON. In what follows, the description of the program will be based on the contrary assumption that the input frame is OFF.

The program reaches decision block 330 after it determines (decision block 160) that the input frame is OFF. At decision block 330, the program determines whether the value of Previous, representing the input to Cadence Detector 55 at the immediately preceding frame of the telephone signal, is OFF. If so, this indicates that two or more successive frames have been OFF and control is transferred to action block 340, otherwise, this indicates that this is the first OFF frame of the cycle and control is transferred to action block 380. Note should be taken of the following. As was discussed earlier, if the first frame of a telephone signal is OFF, Previous would have been initialized to ON to prevent the first OFF frame of a message from being treated as a continuation of a series of previous OFF frames. Therefore, if the first frame of a telephone signal is OFF, control will be transferred to action block 380 rather than action block 340.

At action block 340, the program increments the count of the number of successive OFF frames, N_OFF, by 1. Control is then passed to block 320, described above.

The program reaches action block 380 after it determines (in decision block 330) that this is the first OFF frame of the cycle. In action block 380, the program sets the value of N_OFF to 1. This indicates that the input frame is the first OFF frame of a new cycle and that the previous ON period, if any, is ended. Control is then transferred to action block 390.

At action block 390, the program sets the value of Previous to OFF. The effect of this will be that the next succeeding frame, if OFF, will be treated as a continuation of a sequence of OFF frames, and if ON, will be treated as the start of a new sequence of ON frames. Control is then transferred to decision block 400.

At decision block 400, the program compares the duration of the last ON period with the duration of the immediately preceding ON period. In particular, the absolute value of the difference in duration between the two successive ON periods is compared to a predetermined value, ON_TOLERANCE. If the absolute value of the difference is greater than ON_TOLERANCE, the program has determined that the two successive ON periods are not approximately equal in length and that no far-end disconnect signal has been detected. In that event, control is transferred to action block 430, otherwise, control is transferred to decision block 410. The value of ON_TOLERANCE is 2 frames (or 64 milliseconds) in order for the two periods to be considered sufficiently equal in length to constitute an additional repetition of a cycle. Either a wider or narrower tolerance could be used in other embodiments of the present invention.

At decision block 410, the program compares the length of the last ON period with a minimum ON period MIN_ON. If the length of the last ON period is less than MIN_ON, then the length of the ON period is too short for the signal to be a far-end disconnect signal. In that event, control is transferred to action block 430, otherwise, control is transferred to action block 420. The value of MIN_ON is 6 in the preferred embodiment, indicating that the minimum length of an ON period is a far-end disconnect signal is 6 frames (or 192 milliseconds) in order for the period to be recognized as a part of a far-end disconnect signal. Either a longer or a shorter minimum ON period could be used in other embodiments of the present invention.

At action block 420, the program increments the count of the number of cycles detected, Cycle, by 1. Control is then transferred to action block 290, described earlier.

The program reaches decision block 430 after it has determined that the last ON period is either not the same as the previous ON period or that it is too long or too short for the signal to be a far-end disconnect signal. At decision block 430, the program resets the count of the number of cycles detected, Cycle, to 0. Control is then transferred to action block 290, described earlier.

The present invention is not restricted to embodiments of Cadence Detector 55 which compare timing differences between two consecutive ON times and/or two consecutive OFF times. For example these comparisons may be modified to utilize more that two consecutive ON times or OFF times, respectively. Further, one may utilize a different program to perform cadence detection.

Those skilled in the art recognize that further embodiments of the present invention may be made without departing from its teachings. For example, embodiments of the present invention for detecting and identifying far-end detect signals in telephone calls may utilize a fast fourier transform to provide filter bank 15 or other well known methods and apparatus may be used to provide spectral information for input signal 10. Further, although the frequency range of approximately 250 Hz to 750 Hz was used to detect and identify far-end disconnect signals because this range covers approximately most call progress tones, other embodiments may use frequency ranges that differ from this range. Still further, further embodiments may be fabricated wherein the frequency range of approximately 250 Hz to 750 Hz is detected by a single filter. Yet still further, the bandwidths of each of the filters in Filter bank 15 need not have a bandwidth of approximately 250 Hz and they do not need to be the same.

In addition to the above, some of the above-described parameters may be varied—specifically, FEDSNR and MIN_POWER; MIN_ON, MIN_OFF, MIN_CYCLE and MAX_OFF; ON_TOLERANCE and OFF_TOLERANCE; and DIAL_TONE_LEN.

Lastly, as those of ordinary skill in the art can readily appreciate, embodiments of the above-described far-end disconnect detector may be embedded into a voice processing equipment or they may be built as a separate piece of equipment which is installed as a front-end to the voice processing equipment or a telephone switch. Further, as has been explained above, embodiments of the present invention may be fabricated as programs which are executed on a microprocessor, as hardware circuitry, or as a combination thereof. In the preferred embodiment, Frame Decision Block 35 and Frequency Domain Decision Block 45 were fabricated as programs which execute in a digital signal processor (DSP) and Cadence Detector 55 was fabricated as a program which executes on an Intel 80188 microprocessor.

What is claimed is:

1. A method for detecting a far-end disconnect signal in a telephone signal, which method comprises the steps of:

determining a measure of the signal power of the telephone signal for predetermined frequency ranges and for predetermined time periods;

at each predetermined time period, determining that the time period is characteristic of the far-end disconnect signal whenever the sum of the measures of the signal power for predetermined ones of the predetermined frequency ranges is (a) greater than the signal power for predetermined other ones of the predetermined frequency ranges and (b) greater than a predetermined measure and determining that the time period is non-characteristic otherwise;

determining the number of consecutive time periods during which time periods are characteristic, determining the number of consecutive time periods during which the time periods are non-characteristic, and determining the number of consecutive cycles of such characteristic and non-characteristic consecutive time periods; and reporting that the far-end disconnect signal has been detected when a predetermined number of consecutive cycles has been counted, wherein the step of determining a measure of the signal power for predetermined frequency ranges and for predetermined time periods comprises the steps of:

at each predetermined time period, applying the signal to a predetermined number of filters, said filters spanning the frequency range of typical human speech and far-end disconnect signals, with one or more filters covering the frequency range of far-end disconnect signals, and one or more filters covering the frequency range of typical human speech above and below the frequency range of far-end disconnect signals; and applying the output of each filter to a filter output power determination circuit to provide a measure of the signal power for each predetermined period of time.

2. The method of claim 1 wherein the step of determining whether the time period is characteristic or non-characteristic further comprises the step of:

determining whether the majority of a predetermined number of consecutive time periods are characteristic or non-characteristic.

3. The method of claim 1 wherein the step of determining the number of cycles comprises the steps of:

determining consecutive time periods which are characteristic and consecutive time periods which are non-characteristic.

4. The method of claim 3 wherein the step of determining the number of cycles further comprised the steps of:

determining approximately matched lengths of the consecutive periods which are characteristic and approximately matched consecutive periods which are non-characteristic.

* * * * *